United States Patent [19]

Hollingsworth

[11] 4,083,295

[45] Apr. 11, 1978

[54] COFFEE MAKER WITH STEAM FLUSHING CYCLE

[75] Inventor: Elmont E. Hollingsworth, Stockton, Minn.

[73] Assignee: Lake Center Industries, Winona, Minn.

[21] Appl. No.: 648,389

[22] Filed: Jan. 12, 1976

[51] Int. Cl.² ............................................. A47J 31/00
[52] U.S. Cl. ...................................... 99/283; 99/293; 99/295; 99/302 R
[58] Field of Search ................. 99/280, 281, 282, 283, 99/293, 295, 299, 302 R, 307, 290; 126/348; 137/519; 426/590; 122/406 ST

[56] References Cited

U.S. PATENT DOCUMENTS

| | | | |
|---|---|---|---|
| 2,670,755 | 3/1954 | Kendrick | 137/519 |
| 2,835,782 | 5/1958 | Stiebel | 99/281 |
| 2,926,234 | 2/1960 | Palmer | 99/281 |
| 3,085,495 | 4/1963 | Rosander | 99/283 |
| 3,358,583 | 12/1967 | Lepoix | 99/307 |
| 3,371,592 | 3/1968 | Remy | 99/282 |
| 3,423,209 | 1/1969 | Weber | 99/282 |
| 3,691,934 | 9/1972 | Horn | 99/290 |
| 3,804,635 | 4/1974 | Weber | 99/283 |

Primary Examiner—Robert W. Jenkins
Attorney, Agent, or Firm—Merchant, Gould, Smith, Edell, Welter & Schmidt

[57] ABSTRACT

An automatic coffee maker for rapid, convenient, drip-free brewing of single cups of coffee has a "flow fuse" acting in the space above a brew basket into which the output of a hot water generator passes: the fuse allows passage of small quantities of steam, but is closed by larger steam flow to force the steam to pass downward through the ground coffee, terminating the brewing process and drying the spent grounds thereafter to permit their removal and discard without drippage.

9 Claims, 8 Drawing Figures

COFFEE MAKER WITH STEAM FLUSHING CYCLE

BACKGROUND OF THE INVENTION

This invention relates to the culinary arts, and specifically comprises apparatus for automatically brewing individual servings of coffee in a rapid, convenient, and drip-free fashion.

The conventional way of making coffee is to brew a pot full, discard the grounds, and keep the coffee warm until it is served. It is noticeable that the first cup from a newly brewed pot of coffee has a taste which is different from and superior to that of the last cup: the interval of standing, together with maintained warmth, coact to subtly modify the liquid so that its taste deteriorates.

One obvious procedure is to brew only one cupful at a time, just as instant coffee is made one cup at a time. The generally available coffee making equipment is not well adapted to making coffee in such small quantities, however. If only so much ground coffee is used as is appropriate for a single cup of water, the layer of coffee is not sufficiently thick to allow proper percolation of the water therethrough. To use a larger quantity of coffee and discard it after one cup has been brewed is very wasteful, but passing further cups of water through the same grounds after repeated intervals produces poor coffee because the grounds also deteriorate with time. Finally, it takes nearly as long to make one cup of coffee, by any of these methods, as it does to make a pot full.

SUMMARY OF THE INVENTION

The present invention comprises means for brewing single cups of high quality coffee conveniently, expeditiously, and safely. This is accomplished by an assembly including a filling reservoir, a hot water generator, and a brew basket, associated in a housing having a recess to receive a cup for coffee being brewed, the brew basket being removably insertable into the housing, and preferably being of volume to hold ground coffee enough to yield a single cup of brewed product. Coffee is placed in the basket, the latter is inserted into the housing and secured tightly, a cup of water is poured into the reservoir, and the cup is positioned in the recess. When a switch is operated, the water is heated and is discharged in spurts over the coffee to percolate through to the cup. When the greater part of the water has been so discharged, the remainder is discharged as steam, forcing the water through the coffee and then drying the latter so that subsequent removal of the basket is substantially drip-free. This operation is accomplished by a "flow fuse" or automatic valve located over the brew basket, and normally opening a restricted passage therefrom: when the steam is discharged in quantity, this valve is actuated to close the passage. A warning signal is displayed while there is steam pressure above the coffee. After all of the water is driven from the generator, energization of the heater is automatically interrupted and the warning signal disappears.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
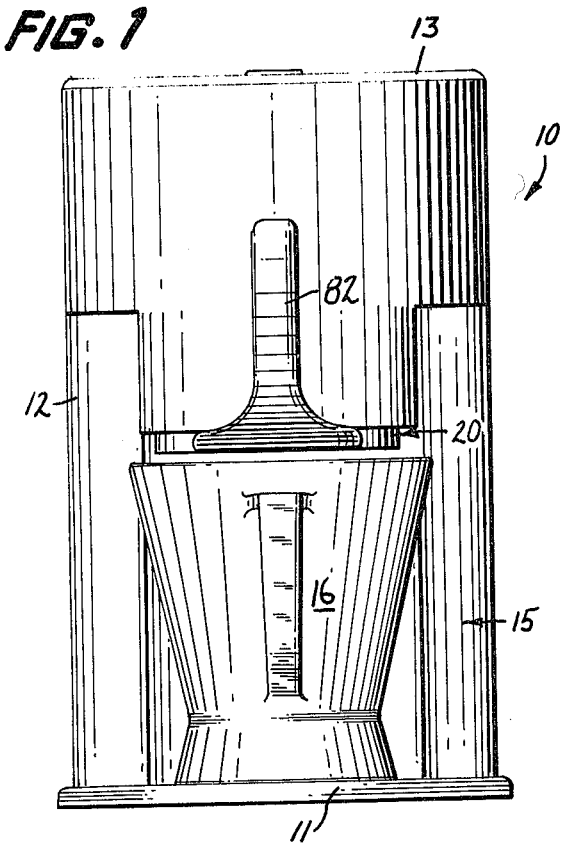
FIG. 1 is a front elevation of a coffee maker embodying the invention.
Figure 5:
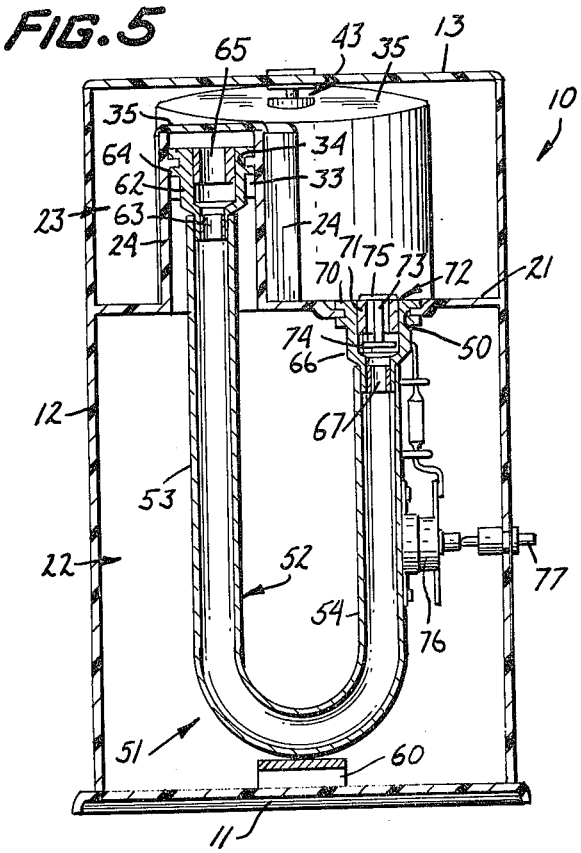
FIG. 5 is a sectional view taken generally along the line 5—5 of FIG. 3.
Figure 2:
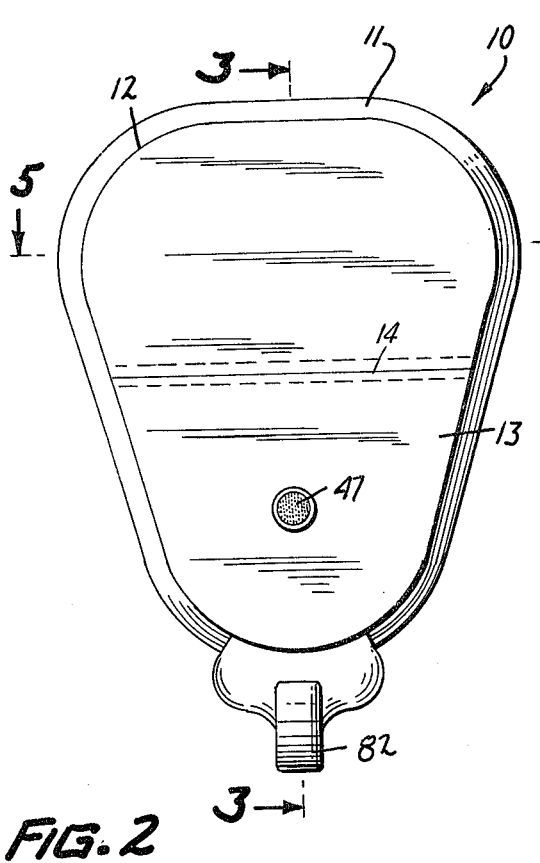
FIG. 2 is a plan view of this apparatus.
Figure 4:
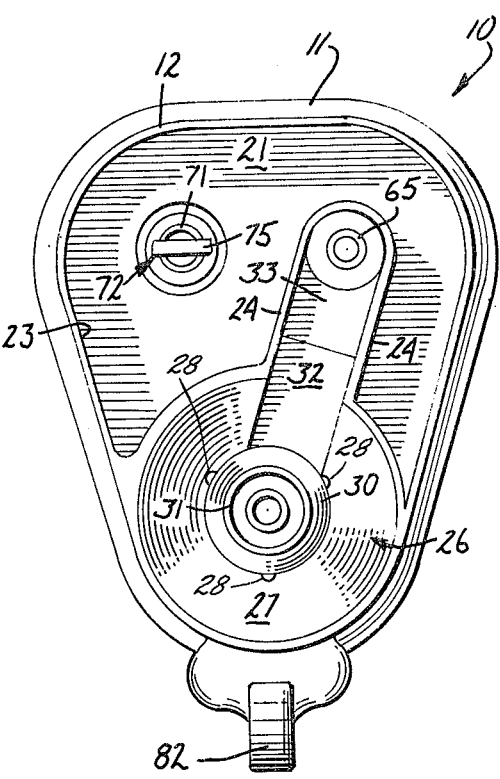
FIG. 4 is a top view of the apparatus with certain parts removed for clarity of illustration.
Figure 3:
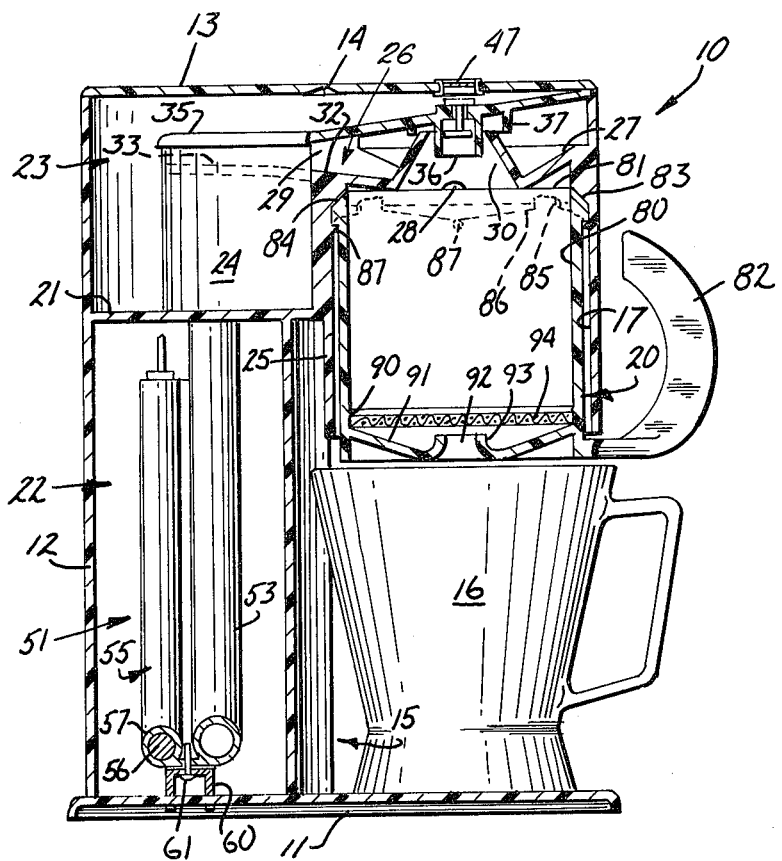
FIG. 3 is a side view of the apparatus in vertical section taken generally along the line 3—3 of FIG. 2.

The invention is shown to comprise a plastic housing 10 having a base 11, a body 12, and a top 13 formed with an integral hinge 14. The lower portion of body 12 is formed as a recess 15 to receive a cup or mug 16 for the coffee being brewed.

Above the position of the cup, the housing is formed to comprise a downwardly opening chamber 17 for receiving a brew basket 20, and a generally horizontal partition 21 divides the body into a lower, heater compartment 22 and an upper, filling reservoir 23.

Figure 8:
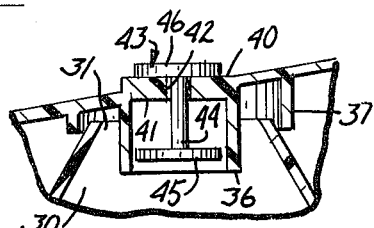
FIG. 8 shows a detail to a larger scale.

Chamber 17 extends upwardly into reservoir 23, and the wall 24 therebetween is extended downward at 25 to complete the wall of chamber 17. The top of chamber 17 is closed by a shaped partition 26. When viewed from the top, partition 26 comprises a generally concave central portion 27 perforated at several locations 28, having a convexly conical central portion 30 with a central opening 31, and a laterally extending tongue 32 sloping upward to a horizontal surface 33 having an aperture 34. A cap 35 overlies members 24–33 to define a closed space 29 above tongue 32, and may be cemented or otherwise secured in place. A pair of cylindrical walls 36 and 37 extend downwardly from cap 35, so that conical member 30 may project upwardly therebetween. In this area the cap is formed with a pair of opposite upper and lower horizontal surfaces 40 and 41 traversed by a passage 42. A "flow fuse" 43, the function of which will be described below, is best shown in FIG. 8 to include a shaft 44 fitting loosely in passage 42 and considerably restricting it, and a valve disc 45 formed at the lower end of shaft 44 to seat against the undersurface 41 in sealing relation to passage 42. At its upper end, shaft 44 carries a warning signal in the form of a disc 46 of color contrasting with that of housing 10. A transparent window 47 is formed in cover 13 in line with flow fuse 43: when passage 42 is closed by valve disc 45, signal 46 is brought close to window 47 and can be seen therethrough, but when the passage is open, disc 46 is displaced downwardly from window 47 and is not readily visible.

An aperture 50 is formed in partition 21 at the bottom of reservoir 23, and a hot water generator or thermal pump 51, a combined heater and pump, is connected between apertures 34 and 50. Generator 51 comprises a vertically oriented U-tube 52 having a longer leg 53 and a shorter leg 54. An electric heater 55 also in U form is secured in heat conducting relationship to tube 52 over most of its length between its ends, and comprises an electrical heating unit 56 contained in a sheath 57. For convenience, sheath 57 and tube 52 may be made unitary. The generator is supported on and may be insulated from base 11 by means such as a bracket 60 and a rivet or pin 61.

Into the longer end 53 of U tube 52 is inserted a connector 62 of soft rubber or similar material reinforced by an inner rigid tube 63. Connector 62 is shouldered at 64 to be received in aperture 34 in surface 33, and is then reinforced by an inner rigid tube 65.

Into the shorter end 54 of the U tube 52 is inserted a connector 66 of soft rubber or similar material reinforced by an inner rigid tube 67. Connector 66 is shouldered at 70 to be received in the aperture 50 in partition 21, and is then reinforced by an inner rigid tube 71. A check valve 72 comprises a stem 73 passing through tube 71 and bearing at its lower end a valve disc 74. A suitable keeper 75 at the upper end of stem 73 retains the valve within tube 71. The arrangement is such that pressure in the U tube below valve 72 causes disc 74 to close off the tube to prevent flow of fluid upward into reservoir 23, but when check valve 72 is open fluid can flow past keeper 75, stem 73 and disc 74 into the U tube.

A thermoswitch 76 is mounted on tube 52 in heat conducting relation to the shorter leg 54. Switch 76 may be actuated into an "ON" condition by a manual operator 77 passing through housing 12 for external actuation by the user's fingers. The switch is automatically returned to an "OFF" condition when the temperature of tube 54 exceeds a predetermined value.

Basket 20 comprises a plastic cylinder 80 open at its upper end 81 and formed with an integral handle 82 extending from its lower portion. Its thickened rim is outwardly tapered at 83 to match an inwardly tapered shoulder 84 in housing 12, and is formed with circumferentially spaced paraxial grooves 85 joined by peripheral, tapering lands 86. A plurality of pins 87 project inwardly from housing 12 and are circumferentially spaced therearound. In a first orientation of basket 20 in housing 12, the grooves permit passage of the pins, and thereafter rotation of the basket causes the pins to ride along under the lands and draw the basket securely into place.

An inwardly directed bead 90 extends around the inside of the basket, and the bottom of the basket comprises a flattened conical surface 91 with a central aperture 92 surrounded by an anti-drip lip 93. A filter 94 is inserted into the basket and pressed against its bottom until the periphery of the disc snaps under bead 90, which then holds the disc into position. Filter 94 conveniently comprises a perforated support disc to which a woven polyester filter is welded.

Figure 7:
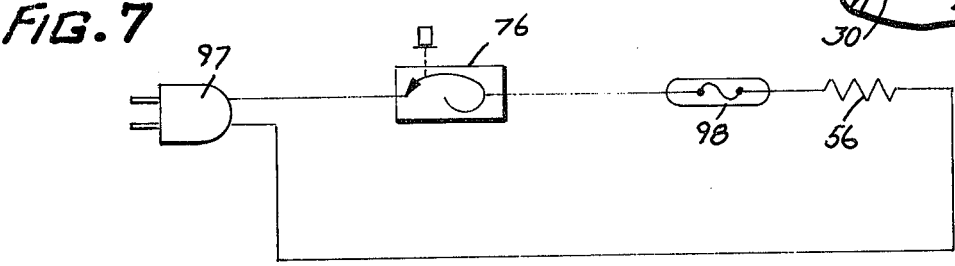
FIG. 7 is an electrical wiring schematic of the apparatus.

FIG. 7 shows that the heater 56 is connected, in series with a fuse 98 and thermoswitch 76, to a conventional AC plug 97: in this figure, switch 76 is shown in its closed position.

Figure 6:
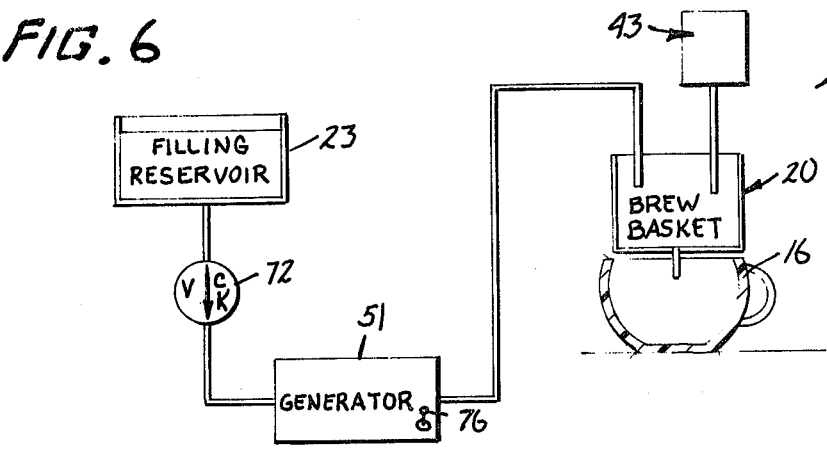
FIG. 6 is a functional schematic of the apparatus.

The general operation of the coffee maker is as shown in FIG. 6. Water from reservoir 23 flows past check valve 72 into generator 51. Coffee is placed in basket 20 on top of filter 94 and a cup is positioned to receive the brew. When switch 76 is turned on, generator 51 operates to discharge first hot water and presently steam at the top of basket 20, which is vented through flow fuse 43 until the steam volume is sufficient to close the vent passage. The resulting steam pressure accelerates the percolation of water through the coffee and thereafter partially dries the grounds by its heat. When the generator runs dry, its temperature rises to shut off the heater at switch 76. This operation will now be described in more detail.

The coffee maker normally sits on some convenient level surface and is plugged into an electrical outlet, switch 76 being OFF. Top 13 is closed, signal 43 is retracted, and the apparatus is clean and dry. When it is desired to brew coffee, basket 20 is withdrawn from housing 12, a filter is pressed into its bottom, and a charge of ground coffee sufficient to brew one cup of the beverage is placed on the cloth. The basket is now raised into the housing until grooves 85 pass upward past pins 87, and then is rotated so that the pins engage lands 86 and draw tapers 83 and 84 into intimate engagement, to prevent passage of fluids therebetween. A channel now exists from reservoir 23 past check valve 72 through heater tube 52, through the space 29 between tongue 32 and cap 35, and through holes 28 into the top of basket 20. A restricted passage from the top of basket 20 may be traced through aperture 42 and flow fuse 43.

Cover 13 is now opened and a cup of cold water is poured into reservoir 23, the cup being positioned in recess 15. The water flows past check valve 72 into tube 52, rising in both legs of the tube well above the curve between them. Cover 13 is closed and operator 17 is used to actuate switch 76. Electrical energy is now supplied to heater 55, and the heat is conducted to tube 53, raising the temperature of the water. Presently, steam is generated in the water, ejecting the water and some steam toward both ends of the tube. Check valve 72 prevents return of any appreciable fluid into reservoir 23, however, so it all issues in spurts through connection 64, running down tongue 32 and through holes 28 to the top of the coffee in basket 20. At this time, any small quantity of steam accompanying the hot water may pass out flow fuse 43.

This process continues until not enough water remains in tube 52 to close it and hence be ejected in liquid form. The remaining water proceeds to boil away, and a quite considerable volume of steam passes to the top of the basket, its exit into the reservoir being prevented by valve 72. This steam is in excess of the quantity which can flow out through restricted passage 42, and disc 45 now seats against surface 41. There being now no other steam exit than the somewhat restricted one through the wet coffee grounds, the pressure above the basket rises, and this in turn forces the water in the basket to percolate more rapidly downwardly, reducing the total brewing time. When disc 45 rises to close passage 42, signal 46 becomes apparent at window 47, warning the user that positive steam pressure exists above the coffee, so that the brewing process should not yet be interrupted. After the water has all percolated through the coffee grounds, a low resistance path for steam exists there, and the steam passes downward and out through opening 92, warming and drying the spent coffee grounds as it does so.

Check valve 72 also functions as a relief valve. If for any reason the pressure acting upward on disc 74 becomes excessive, tube 71 is forced upward out of connector 66, releasing the steam into the reservoir volume.

As the water boils out of tube 52, the tube temperature rises, and presently switch 76 is thermally opened. Generation of steam ceases. The pressure above the coffee grounds drops, signal disc 47 disappears from view, and the user may now remove a cup of brewed coffee from recess 15. By this time, the passage of steam has warmed and partially dried the basket and its contents, and when it is removed to discard the used grounds, no unwelcome dripping occurs.

It will be appreciated that the function of flow fuse 43 would be partially and imperfectly accomplished by a simple orifice of small size similarly located: other appropriate valving arrangements could also be substituted with various degrees of success.

From the viewpoint of sanitation, it will be seen that nothing but clear water enters reservoir 23, heater tube 52, space 29, or the upper conical surfaces of partition 26, and that when basket 20 is removed, every element which comes in contact with coffee is removed with it. Filter 94 and basket 20 may be rinsed or washed and replaced, restoring the apparatus to its initial condition.

From the above, it will be apparent that I have invented a new coffee making apparatus in which a flow fuse regulates the discharge of steam at the end of the brewing process, preventing the buildup of pressure over the brewing basket as long as the discharge thereinto is principally liquid; but closing when a volume of steam appears to enforce rapid percolation through the coffee to a drip-free conclusion.

Numerous characteristics and advantages of my inventon have been set forth in the foregoing description, together with details of the structure and function of the invention, and the novel features thereof are pointed out in the appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

What is claimed is:

1. In a coffee maker, in combination:
    a housing having a filling reservoir and having a recess to receive a cup for coffee;
    a brew basket removably insertable in said housing at a location above said recess;
    means for heating water and dispensing it to the top of said brew basket through a predetermined channel having said basket at one of its ends, said means comprising a vertical U-tube with a longer leg connected to said brew basket and a shorter leg connected to said reservoir, a heater in thermally conductive relation to said U-tube, and a check valve for preventing passage of fluid from said U-tube to said reservoir;
    and valve means in said housing operative to move between a first position, in which it opens a small outlet passage from said channel above said basket, and a second position, in which it closes said passage.

2. The structure of claim 1 including a bayonet connection between said housing and said brew basket whereby the upper rim of said basket may be tightly sealed against the wall of said housing to prevent substantial fluid passage therebetween.

3. In a coffee maker:
    a hot water generator energizable to supply first hot water and later steam to a utilization device having restricted egress, said generator comprising a U-tube, a heater in thermally conductive relation to said tube, and means for introducing water into said U-tube to a height sealing the tube against unobstructed passage of fluid therethrough; and valved means normally providing a restricted channel past said device, but operable by increase of steam at said device to shut off said channel.

4. A structure according to claim 4 which includes a filling reservoir and U-tube is vertical with a first leg connected to said brew basket and a second leg connected to said filling reservoir, and a check valve for preventing passage of fluid from said U-tube to said reservoir.

5. The structure of claim 3 in which said heater is electrically energizable, and including means manually operable to energize said heater and thermally operable to deenergize said heater at a predetermined temperature of said U-tube.

6. The structure of claim 5 in which said restricted channel is large enough to transmit the small quantity of steam which accompanies discharge of hot water into said chamber, but too small to pass larger volumes of steam resulting when said generator is nearly empty, whereupon steam pressure rises in said chamber sufficiently to operate said valve means.

7. A coffee maker comprising, in combination:
    a housing having a recess to receive a cup for coffee;
    a filling reservoir in said housing for receiving a charge of water;
    an electrically energizable generator in said housing and connected to said reservoir for raising the temperature of water received therein to the boiling point and discharging the heated product;
    a bottomless, covered chamber in said housing connected to receive said heated products at its upper portion;
    a brew basket for removable insertion upward into said chamber so that said heated products may be discharged upon the surface of a charge of coffee in said basket and percolate downward therethrough;
    a recess in said housing under said chamber for receiving a cup to be filled with brewed coffee;
    means preventing reverse flow from said generator into said reservoir;
    a restricted output passage in the cover of said chamber;
    valve means operable to close said passage;
    warning means giving an indication visible outside said housing when said valve is closing said passage;
    and control means actuable to energize said generator, and operable upon rise in temperature of said generator beyond a predetermined value to deenergize said generator.

8. The structure of claim 5 in which the generator comprises a vertically disposed U-tube having a shorter leg connected to said reservoir and a longer leg discharging into said chamber, and in which said control means is in heat conductive relation to said shorter leg.

9. The structure of claim 7 in which said warning means is combined with an actuator by said valve means.

* * * * *

UNITED STATES PATENT AND TRADEMARK OFFICE
CERTIFICATE OF CORRECTION

PATENT NO. : 4,083,295
DATED : April 11, 1978
INVENTOR(S) : Elmont E. Hollingsworth It is certified that error appears in the above–identified patent and that said Letters Patent are hereby corrected as shown below:

Claim 4 of the patent, line 2, before "U-tube" insert said.

Column 6, line 7, "claim 4" should read -- claim 3 --.

Signed and Sealed this

Thirty-first Day of October 1978

[SEAL]

Attest:

RUTH C. MASON
Attesting Officer

DONALD W. BANNER
Commissioner of Patents and Trademarks